United States Patent [19]
Cartwright

[11] Patent Number: 4,542,607
[45] Date of Patent: Sep. 24, 1985

[54] AERODYNAMICALLY STABLE SURFACE RIDING WEEDLESS FISHING LURE

[76] Inventor: Earl Cartwright, 86 House Dr., Akron, Ohio 44319

[21] Appl. No.: 614,028

[22] Filed: May 25, 1984

[51] Int. Cl.⁴ .............................................. A01K 85/04
[52] U.S. Cl. .................................. 43/42.52; 43/42.28
[58] Field of Search .................. 43/42.5, 42.52, 42.28, 43/42.18, 42.53; D22/29

[56] References Cited

U.S. PATENT DOCUMENTS

| | | | |
|---|---|---|---|
| 446,827 | 2/1891 | Cass | 43/42.52 |
| 734,703 | 7/1903 | Harlow | 43/42.52 |
| 1,896,132 | 2/1933 | Berberich | 43/42.28 |
| 1,910,742 | 5/1933 | Binns | 43/42.52 |
| 2,145,283 | 1/1939 | Accetta | 43/42.28 |
| 2,167,163 | 7/1939 | Toepper | 43/42.52 |

Primary Examiner—Gene P. Crosby
Attorney, Agent, or Firm—Oldham, Oldham & Weber Co.

[57] ABSTRACT

A lure for surface fishing in weedy areas. The lure has a weighted, spoonshaped body with a long tufted tail extending at an angle from the rear of the body and large, widely set double hooks rigidly attached to the concave side of the body. The aerodynamic shape of the lure allows it to fall in a "hooks-up" position when cast and the tail member supports the lure in such a "hooks-up" position during a landing and a sliding retrieval along the surface of weed filled waters.

5 Claims, 7 Drawing Figures 4,542,607

1

AERODYNAMICALLY STABLE SURFACE RIDING WEEDLESS FISHING LURE

TECHNICAL FIELD

The present invention relates to a fishing lure adapted for use in fishing the surface of weed filled waters wherein the lure has wide set, fully exposed hooks maintained by the structure of the lure in a position at or above the surface of the water such that the lure and/or hooks do not become fouled or entangled with weeds during the landing or retrieval.

When fishing for fish which inhabit weed filled waters, most notably large mouth black bass, problems are encountered with frequent snagging of the weeds unless weed guards are employed on such a lure to cover and divert weeds from the exposed points and flanks of the lure's hooks. Incorporation of such weed guards on hooks of a so-called weedless fish lure has the frequent effect of preventing the hooks from "hooking" a striking fish as the guards serve to divert the hook point from contact with the mouth of a striking fish. The two basic problems encountered with conventional weedless surface lures or spoons are:

(a) If the lure is made weedless, hooking of fish is a problem.

(b) If the problem of hooking of fish is solved, the lure is no longer weedless.

If the lure is made weedless by the use of weed guards, then hooking becomes a problem. As noted above, the weed guards serve to divert the hook point or points from contact with the striking fish's mouth. Unless the hook or hooks are "set" while the fish's mouth is closed, it is impossible to hook the striking fish because as soon as the fish opens its mouth to reject the lure, the lure becomes weedless once again. And, in order to "set" the hook or hooks while the fish's mouth is closed means that the lure must be moved in the mouth of a fish that is clamping down on it, which is very, very difficult if not impossible.

If a lure or spoon is made weedless by the use of a single hook with or without the use of a weed guard, only the strikes that come from the rear have any chance of hooking a striking fish. When a strike occurs from either side, the single hook is invariably turned sideways in between the jaws of the fish as it takes the lure from the surface and carries it down into the water. When in the fish's mouth in a sideways position, the single hook is easily pulled out of the fish's mouth by the eager fisherman without hooking.

If more hooks than one are used without weed guards to solve this problem, then the lure is no longer weedless. It can be used satisfactorily only along the edges of the weeds because it must, by its own nature, land in open water or the hooks will foul with weeds on the landing or retrieval.

It is the primary object of the present invention to provide a lure for surface fishing in weed filled waters which has multiple hooks and will remain weedless upon landing as well as during retrieval and will, at the same time, hook a far greater percentage of striking fish than will any surface lure or spoon made weedless by conventional means.

It is also an object of the present invention to provide a lure for surface fishing weed filled waters which has an aerodynamic design which causes the lure to fall and land in a "hooks up" position with the structure of the lure also tending to maintain it in such a "hooks up"

2 position during a skimming retrieval along the surface of the weedy waters, such that the hooks remain above and free of the weeds on and just below the water's surface.

It is also an object of the invention to provide a weedless fishing lure for fishing the surface of weed filled waters that has wide set fully exposed multiple hooks without the incorporation of any weed guard feature such that a striking fish is easily hooked by the user of such a lure.

Yet another object of the invention is the provision of a fishing lure for fishing weed filled waters which is of relatively simple and inexpensive construction.

Yet another object of the invention is the provision of a lure for surface fishing weed filled waters which is attractive to fish lurking in the weeds below the surface of the water, when seen from below during retrieval of the lure.

Yet another object of the invention is the provision of a weedless fishing lure having widely spaced unprotected hooks easily capable of hooking a fish striking the lure from any of a variety of directions.

The above and other objects of the invention are achieved by providing a fishing lure which consists essentially of a spoon shaped body member having a concave upper side and a convex lower side, a weight means attached to the concave side of the body member, a wide set double hook extending at a slightly upwards angle over the rearward concave side of the body member and a double sheathing of inner short stiff bristles and outer long flexible bristles attached by a wrapping to the hook shanks and extending rearwardly from the body at the slighly inclined angle of the hooks shank to provide a tail assembly attractive to the fish and which serves also to support the lure in the "hooks up" position during casting, landing and retrieval.

For more complete understanding of the invention and the objects and advantages thereof, reference should be made to the accompanying drawings and the following detailed description wherein there is shown a preferred embodiment of the invention.

DISCLOSURE OF INVENTION

Figure 1:
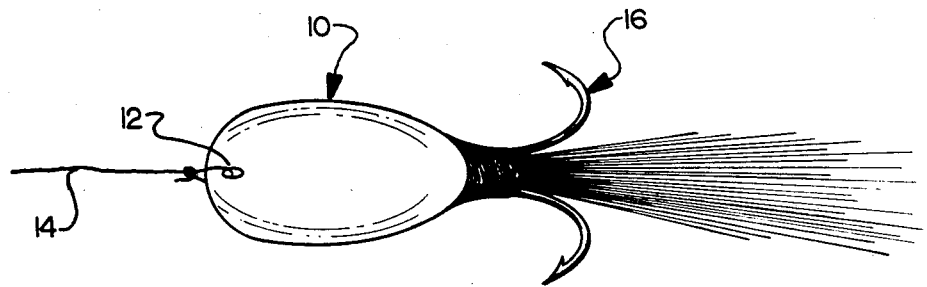
FIG. 1 is a top plan view of a first embodiment of the lure of my invention.
Figure 2:
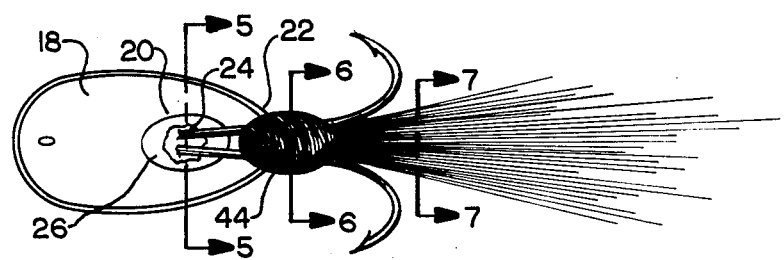
FIG. 2 is a bottom plan view of the lure shown in FIG. 1.

The fishing lure of FIGS. 1 to 7 has a spoon shaped body portion generally indicated by numeral 10 which is provided with a hole 12 in the forward end for attachment of a fishing line 14. A double hook 16 is attached to the concave upper side 18 of the body member from about the midpoint thereof at 20 along the centerline to near the rearward end 22 of the body member 10. This attachment may be made in any suitable manner for example by use of a lead solder at 24 bonding the metal hook eye 16a to the body member 10.

Figure 5:
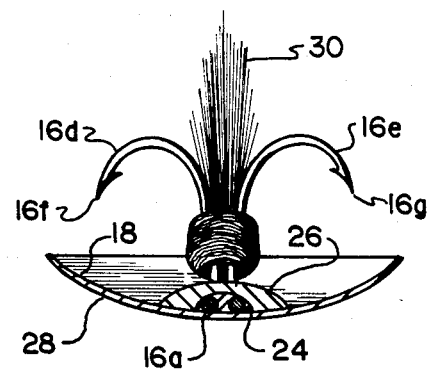
FIG. 5 is a sectional view taken along the line 5—5 of FIG. 2.

In order to achieve the aerodynamic characteristics desired, a weight means 26, as best seen in FIG. 5, is attached to the body on the concave side 18 between the mid-point and the rearward end. The weight means 26 serves to give the lure an aerodynamic balance such that the smoothly rounded convex side 28 of the body 10 acts as an aerodynamically stable device quite similar to a space capsule or other similar non-weighed so-called lifting bodies.

A long fiberous tail 30 creates drag during a falling descent through the air at one end with the fishing line 14 attached to the other end serving the same purpose, such that the lure descends from its highest arc after being cast in a stable "hooks upward" position. Sufficient weight means 26 is necessary in the described portion of the concave side of the body to create this desirable aeronautical attitude during casting and a high probability of a "hooks upright" landing upon the water surface. Specifically it has been found that, using a #7 Indiana spoon body having a length of about 1¾ inches, a width of about 1 5/64 inches, a weight of about 3.8 grams with a size 4/0 double hook weighing about 3.1 grams, added weight positioned between the spoon midpoint and rearward end should be in the range of 1.3 to 1.9 grams with tail bristles weighing about 0.5 grams to achieve the desired aeronautical retrieval characteristics. Using a #6 Indiana spoon body having a length of about 1 9/16 inches, a width of about 29/32 inches, a weight of about 2.5 grams with a size 3/0 double hook weighing about 2.5 grams, it has been found that the added weight positioned between the spoon midpoint and rearward end should be in the range of 1.1 to 1.7 grams with tail bristles weighing about 0.4 grams to achieve the desired aeronautical and retrieval characteristics.

Attachment of the hook 16 and the weight means 26 to the upper concave side 18 of the body is an essential feature leaving the convex lower side 28 of the body with a gently rounded lifelike contour of an attractive appearance when viewed from below by a lurking, hungry fish.

Figure 3:
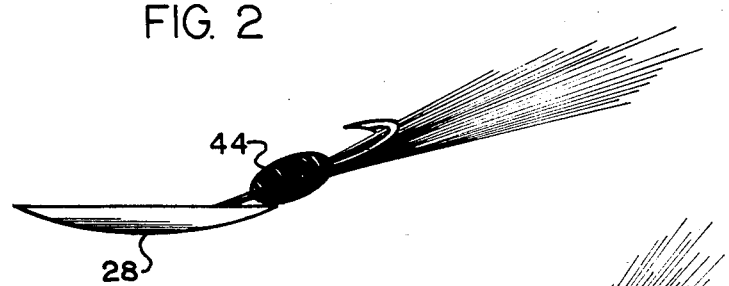
FIG. 3 is a side elevational view of the lure shown in FIG. 1.
Figure 4:
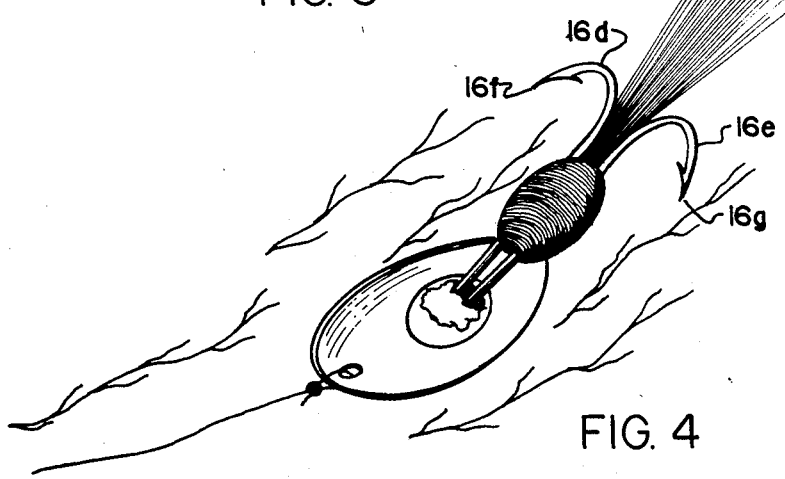
FIG. 4 is a prospective view showing the lure in a "hooks up" position being drawn along the surface of weed filled waters.

The hook 16 extends rearwardly with dual shafts 16b and 16c from the soldered attachment to the body at a slightly inclined angle of about 10° to 45° from a plane through the periphery of the body member. The hook shafts or shanks 16b and 16c join from the eye 16a and extend in a straight line to a position rearward of the body and above the concave side and then split into separate hook portions 16d and 16e curving forward on either side of the body member with the hook points 16f and 16g being at least as wide apart from each other as the width of the body, said points being in a line essentially parallel to a plane through the periphery of the body and pointing generally forward with their barbs on the inside, all as best seen in FIGS. 3 and 4.

Figure 6:
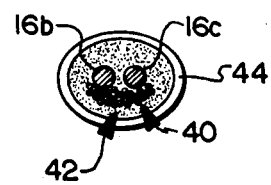
FIG. 6 is a sectional view taken along the line 6—6 of FIG. 2.
Figure 7:
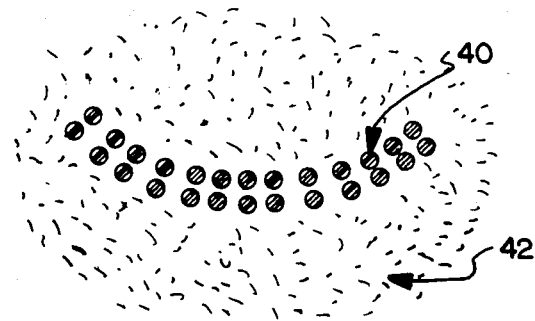
FIG. 7 is a sectional view taken along the line 7—7 of FIG. 2.

The tail 30 consists generally of a sheath of stiff, short inner bristles shown by generally numeral 40 in FIG. 6 and longer, thinner, more flexible outer bristles shown generally by numeral 42 in FIG. 6 lying along side and around the hook shanks 16b and 16c and secured thereto by an outer wrapping of thread 44, with the stiffer bristle 40 lying underneath the hook shanks 16b and 16c and the thinner, longer outer bristles 42 surrounding the hook shanks 16b and 16c all the way around. The attachment of the bristles respective to the hook shanks can be made simply by wrapping thread 44, or by use of an adhesive, or any other suitable means. The outer wrapping of thread 44 used in the embodiment described can be sealed by a glue or varnish for permanent attachment.

The bristles 40 and 42 may be any of a variety of suitable lengths, colors and texture providing that the inner stiffer bristles 40 are sufficiently stiff to support the lure with the hooks held upright above the weed and water surface during land and retrieval. The longer outer bristles serve as a fish attractant, waving and undulating in the water during retrieval of the lure; they further serve to provide an air drag or parachute effect during descent of the lure through the air when cast and they also provide additional support means along with the shorter stiffer bristles supporting the lure in an upright "hooks up" position for landing and retrieval over the surface of the weeds.

Attachment of the tail 30 by sheathing around the hook shanks further provides to disguise the shanks and give the lure a streamlined, life-like, attractive appearance.

An upward tilt to the lure to provide a hydroplaning effect along the surface of the weeds and water is provided by the forward attachment hole in the body with the fishing line tending to pull the lure up as well as forward during retrieval, the tail assembly streaming out flat along the surface of weeds and water.

While in accordance with the patent statutes only the best known embodiment of the invention has been described in detail, it is to be understood that the invention is not limited thereto or thereby, but that the inventive scope is defined in the appended claims.

What is claimed is:

1. An aerodynamically stable, surface riding, weedless fishing lure comprising:
    a spoon shaped body member having a concave side and a convex side, rounded leading and trailing edges, wherein the leading edge is rounded at a greater radius from the trailing edge and having means to effect fishing line attachment at the leading edge;
    a weight means positioned centrally on the rearward portion of the concave side;
    a multiple barbed hook member having shanks extending generally from a centralized position on the concave side toward the trailing edge at an angle of between 10° to about 45° from a plane through the periphery of the body member and wherein the pointed ends of the hooks face toward the leading edge of the body member and at least two hook ends are spaced from each other substantially equal to at least the width of the body member and;
    a flexible tail member extending around the shanks of the hooks substantially rearwardly of the hooks and the body member.

2. An aerodynamically stable, surface riding, weedless fishing lure according to claim 1, wherein the means to effect fishing line attachment at the leading edge consists of a small diameter hole.

3. An aerodynamically stable, surface riding, weedless fishing lure according to claim 1, wherein the flexible tail member consists of a plurality of longer, small diameter, highly flexible hair-like bristles surrounding and substantially concealing a plurality of shorter, thicker bristles of a sufficient stiffness to support the weight of the body member with the leading edge in a position inclined above the trailing edge at an angle of about 10° to about 45° from the center line of the shanks of the hook member.

4. An aerodynamically stable, surface riding, weedless fishing lure according to claim 1 wherein the multiple barbed hooked member consists of a double hook wherein the hook ends lie in a plane generally parallel to a plane through the periphery of the body member.

5. An aerodynamically stable, surface riding, weedless fishing lure according to claim 1 wherein the weight means consists principally of lead solder surrounding the forward ends of the hook member shanks and covering a substantial portion of the rearward end of the concave side of the body member.

* * * * *